Feb. 29, 1944.                    W. C. REHM                    2,342,692
                                 COOKING UNIT
                              Filed April 9, 1941              2 Sheets-Sheet 1
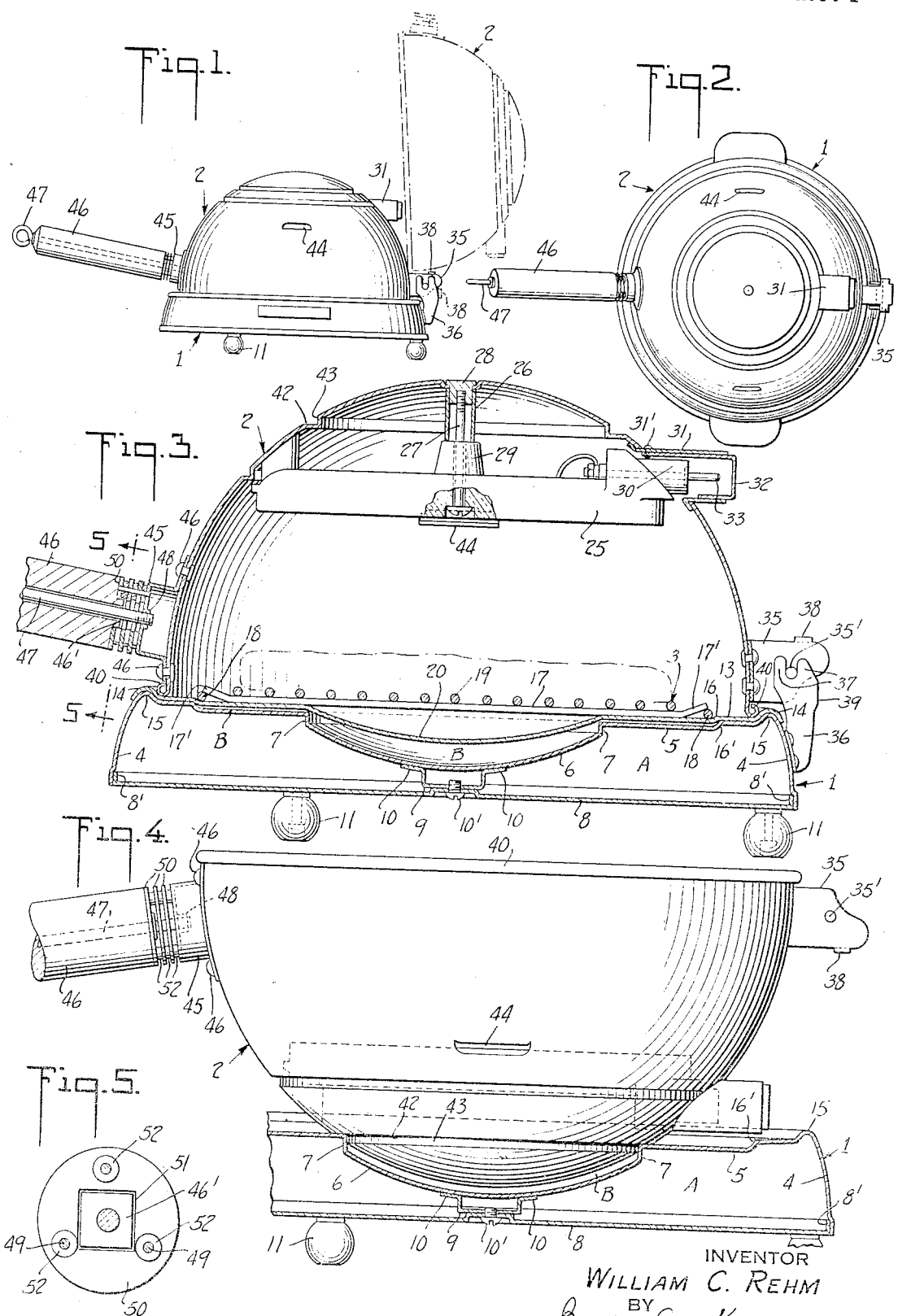
INVENTOR
WILLIAM C. REHM
BY
Bartlett, Eyre, Keel & Weymouth
ATTORNEYS Feb. 29, 1944.  W. C. REHM  2,342,692
COOKING UNIT
Filed April 9, 1941   2 Sheets-Sheet 2
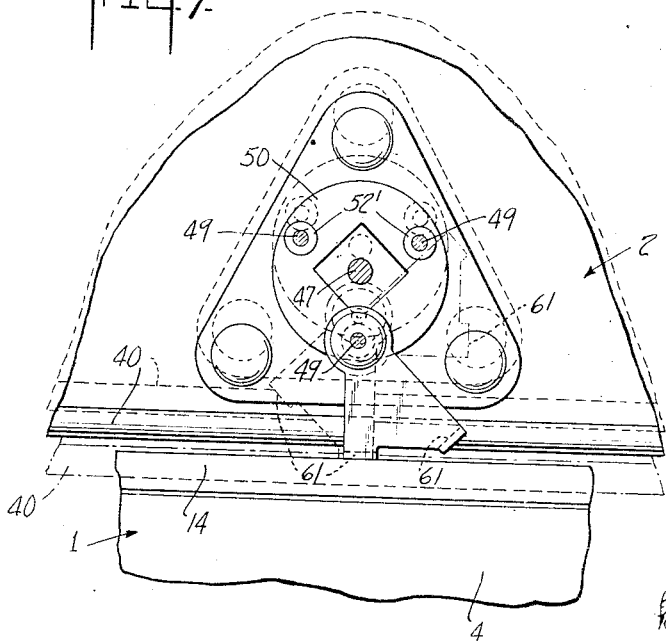
INVENTOR
WILLIAM C. REHM
BY
Bartlett, Eyre, Keel & Weymouth
ATTORNEYS Patented Feb. 29, 1944

2,342,692

UNITED STATES PATENT OFFICE 2,342,692

COOKING UNIT

William C. Rehm, Meriden, Conn., assignor, by mesne assignments, to Manning, Bowman & Co., Meriden, Conn., a corporation of Delaware Application April 9, 1941, Serial No. 387,601

6 Claims. (Cl. 219—35)

This application is a continuation in part of my application Serial No. 307,749, filed December 6, 1939, issued as Patent No. 2,269,480.

This invention relates to cooking utensils and particularly to a unit which may be used for the roasting, broiling, frying and other cooking operations.

One object of the invention is a novel and improved combined cooking unit for the above indicated purposes which is characterized by the ease and facility with which the various cooking operations may be performed.

A further object of the invention is such a unit which is characterized by the safety in operation against burning the user and the table or other support upon which it is supported.

A further object of the invention is a broiler of the above indicated character embodying novel means whereby the broiler cover may be variably supported with respect to the grill for facilitating the cooking operations.

A further object of the invention is a novel and improved handle structure embodying means for variably supporting the cover upon the grill.

A further object of the invention is such a utensil which is characterized by its simplicity in construction and assembly and its low cost in production.

Further objects of the invention will hereinafter appear.

For a better understanding of the invention, reference may be had to the accompanying drawings forming a part of this application, wherein:

Fig. 1 is a side view of a unit embodying the invention and showing one use thereof;

Fig. 2 is a plan view thereof;

Fig. 3 is a sectional view on an enlarged scale thereof;

Fig. 4 is a side view of the unit partly in section indicating another use thereof;

Fig. 5 is a sectional view along the line 5—5 of Fig. 3;

Fig. 6 is a view similar to Fig. 3 illustrating a modification of the invention; and Fig. 7 is a sectional view on the line 7—7 of Fig. 6.

Referring to the drawings the invention is illustrated as embodied in a unit comprising a base 1, an invertible upper member 2 in the form of a dome-like shell and a grid and broiler rack 3. The base consists of a casing enclosing a dead air space A and formed of a top plate 5 having an annular depending peripheral edge or skirt 4 to which is attached in any suitable manner a lower baffle plate 8, and in the particular embodiment shown the baffle plate 8 is provided with a peripheral flange 8' fitting into the peripheral edge of the skirt 4. The top plate 5 has a centrally dished-out part 6 with a shoulder 7 formed at the periphery thereof for a purpose hereinafter described. The top plate 5 carries centrally thereof a supporting and reinforcing arch 9 of thin sheet metal, this arch being fastened to the top plate 5 at the dished-out part 6 in any suitable manner, as, for example, by spot welding the feet 10 formed on the arch to the top plate, the lower portion being fastened to the baffle by a screw 10'. This arch forms a supporting brace between the top plate 5 and the baffle 8 and a means of assembly of the baffle. The base is provided with any suitable supporting feet 11 preferably of insulating material which are fastened to the baffle 8. The baffle 8 and feet 11 thus form the support for the unit and in the preferred form the baffle plate 8 is of imperforate sheet form.

The grid and rack 3 assembly embodies a grid plate 13 which is supported upon the plate 5 of the base. This grid plate 13 is provided with a curved peripheral edge 14 corresponding to a similar annular curved seat 15 formed at the juncture of the plate 5 with the skirt 4 with which it mates to hold the grid plate 13 firmly upon the member 5 of the base. The grid plate member 13 is provided inwardly of its periphery with an annular shoulder 16 for the purpose of centering a grid or perforated plate member resting thereon, this grid member resting flat upon the grid plate 13 and in the particular embodiment shown being a wire rack. This rack comprises a peripheral rim of wire 18 to which the ends of closely spaced parallel wires 19 are secured and to which also the offset ends 17' of a crosswise reinforcing wire 17 are secured, the wires 19 in turn being secured to the cross wire 17 at each of their mid-points, the whole wire assembly being disposed so that its peripheral rim 18 is adjacent to the shoulder 16 formed in the grid plate. A dot and dash line indicates a steak or the like resting upon this wire rack. The grid plate 13 is provided centrally thereof with a pan or dished out part 20 for catching the drippings. The plate 5 is provided with a shoulder 16', corresponding to the shoulder 16 and these shoulders assist in the centering of the grid plate 13 while the plate 5 is dropped down inwardly of the shoulders 16, 16' to form an air chamber B between the plates 5 and 13.

The invertible dome-shaped member 2 is provided with an electric heater unit 25 mounted therein in any suitable manner. In the particular embodiment shown this heater unit is spaced centrally from the dome member by a spacer tube 26 and a screw bolt 27 passes through an opening formed in the heater and is screw-threadedly attached to a holding nut 28 which is inserted through an opening formed centrally of the member 2 and into the spacer tube 26. This tube engages a projection 29 formed with or fastened to the heater unit 25. The electric heater 25 is provided with an electric plug 30 connection which projects out through an opening in the side of the shell and is protected by a hood 31 suitably fastened to the shell. A heating element of conventional coiled resistance wire form (omitted for convenience in illustration) is secured within the labyrinth of the unit 25, and is of two sections with one end of each section terminating in a terminal pin 33 and the other ends joined and secured to a third pin 33 so as to provide "high" and "low" heats depending upon which pair of terminal pins 33 the plug engages, the plug being omitted for convenience in illustration. A U-shaped swinging arm 32 hinged at 31' to the hood 31 protects the user against accidental contact with the free but energized terminal pin, this arm being disposed within the hood and shiftable over laterally to protect the exposed pin when the plug is in. The shell is provided with a hinge bracket 35 which co-operates with a hinge bracket 36 fastened to the side of the base, the bracket 35 carrying pins 35' which are supported in the open fork-like socket bearings 37 formed in the bracket 36, and the bracket 35 carries a hinge stop member 38 which engages the bearing surface 39 formed on the side of the bracket 36 to hold the shell in the vertical position as indicated in dot and dash lines Fig. 1.

The upper member 2 is provided with a beaded edge 40 and the dimensions of the parts are such that the beaded edge in the position shown in Figs. 1 to 3 rests upon the grid plate 13 at the inner edge of the curved rim 14 and the upper member is thereby held and centered in position independently of the bracket 35, 36, although the bracket also performs some holding function.

The member 2 may be inverted from the position shown in Figs. 1 to 3 and supported upon the base 1 as indicated in Fig. 4 to function as an ordinary cooker or heater for various cooking and heating purposes. For this purpose the dome-shaped member 2 is provided with an annular seat 42 with a corresponding retaining shoulder 43 for resting upon the shoulder 7 formed in the base member around the periphery of the dished-out part 6 as shown in Fig. 4. In this position the grid plate and the rack assembly 3 is wholly removed from the unit. The shell is also provided with suitable ventilation openings 44 on opposite sides thereof.

The dome member 2 is provided with a handle bracket 45, this bracket being in the form of a cup-shaped member with peripheral rims riveted at 46 to the side of the dome member adjacent its peripheral edge and on the diametrically opposite side from the bracket 35. A handle 46 made of wood or any suitable material is fastened to the bracket 45 by means of a tightening bolt 47, the latter extending through an opening formed longitudinally of the handle and screw-threadedly engaging an opening formed in the bracket 45 at 48. The handle 46 is insulated from the bracket 45 by insulating bushings 52 carried by pins 49 which are disposed between the spacer discs 50, there being three discs in the particular embodiment shown. The outermost disc 50 is provided with a square hole 51 for the reception of the squared end projection 46' of the handle 46 and, if desired, the other discs 50 may be similarly provided with square openings. This enables tightening of the handle by simply turning the bolt 47 without a corresponding turning of the handle 46. Thus the user may tighten the handle at any time without difficulty.

The dome-like shell member 2 may be reversed in position at any time for use either as a broiler or the like as shown in Figs. 1 to 3 or as an ordinary cooker or heater as shown in Fig. 4. This may be effected by simply lifting and inverting the upper member of the unit and replacing or removing the grid plate and the rack. Since the upper member is curved and dome-shaped at all parts thereof it cannot be inverted as in Fig. 4 and supported stably upon any plane surface as, for example, a table which would be burned thereby. It can only be supported stably by supporting it upon the shoulder 7 of the base forming a seat for the corresponding seat 42 of the shell. Accordingly, this unit may be used with proof against accidental resting or unintentional support of the heat unit carrying part of the device upon a table or the like. Also in operation either as a broiler or as an ordinary cooker the utensil may be safely supported upon any table without danger of burning or scorching of the same. This is due, among other things, to insulation against the transfer of heat by the dead air chambers A and B, to the reinforcing arch of thin sheet metal which is also effective in insulating against the transfer of any heat from the plate member 5 and 6 to the baffle plate 8, to the large heat radiating surface formed by the base member 1 and also to the insulating feet 11.

In the embodiments of Figs. 6 and 7 the handle structure and mount is generally of the same construction as that described above except that the bushings 52' are of metal and the means 60 is embodied therein for variably supporting the cover 2 at different distances from the grill. In the particular embodiment shown this means is in the form of a metallic sector or segment which is pivotally mounted on the lowermost pin 49 at a point between the intermediate pair of discs 50, the thickness of the metal of this segment corresponding approximately to the thickness of the bushings 52'. The lowermost edge of this sector 60 projects down below the periphery of the bracket 45 and engages the peripheral edge 14 of the grid plate 13 to support the side of the upper member 2 at variable distances from the grid plate. For this purpose the sector 60 is provided with a multiplicity of supporting points on its lower edge which are disposed at varying radial distances from the axis of the pin 49 upon which it is mounted, and in the particular embodiment shown there are two such supporting points 61 and 62. These supporting edge parts 61 and 62 are turned inwardly to form tongues or lugs having plane surfaces at right angles to the radii from the center of the pin 49 to the central line of these tongues or lugs. This segment is pivotally adjustable upon the pin 49 to bring either of these supporting lugs 61 or 62 into engagement with the peripheral edge 14 of the grid plate. As illustrated in full lines, the lug 61 is resting upon the periphery 14, and as shown in dotted lines the lug 62 is in position to engage the periphery 14.

By means of the construction illustrated, Figs. 6 and 7, the invertible member 2 may not only be brought to the vertical position and supported there as shown in Fig. 1, but by means of the hinge structure 35 and 36 and the handle structure including the variably supported means 60, this invertible member may be supported in the cooking position either with the edge 40 resting directly upon the grid plate 13 or at variable distances therefrom to provide the desired ventilation during the cooking operation. For instance, with the segments 60 rotated to a position where neither of the supporting lugs 61 or 62 engages the periphery 14 of the grid plate, the dome member 2 rests with its peripheral edge 40 engaging the grid plate all the way around. If ventilation is desired during the cooking operation the segment 60 is rotated to a position to support the member 2 the required distance from the grid plate, as for example on the lug 61 for a small degree of ventilation, or upon the lug 62 for a greater degree of ventilation. All these functions are effected by the simple structure shown.

In the appended claims the word "grill" is intended to include the entire grid assembly and support therefor.

I claim:

1. In a cooking unit of the type having a heater carrying member and a handle attaching bracket fastened thereto the combination comprising a handle fastened to said bracket, said handle comprising a handle grip having an opening extending therethrough, a holding screw bolt passing through said handle grip and threadedly engaging said bracket and an insulating mount between the handle grip and said bracket comprising a plurality of spaced pins carried by the bracket, a plurality of spacer discs threaded over said pins with spacing bushings threaded over the pins and disposed between the discs, the outermost member of said discs having a non-circular opening formed therein and said handle grip having a corresponding non-circular projection extending down into said opening.

2. In a cooking unit of the type having a manually manipulatable cooking member and a handle attaching bracket fastened thereto the combination comprising a handle fastened to said bracket, said handle comprising a handle grip having an opening extending therethrough, a holding screw bolt passing through said handle grip and threadably engaging said bracket and an insulating mount between the handle grip and said bracket comprising a plurality of spaced pins carried by the bracket, a plurality of spacer discs threaded over said pins with spacing bushings threaded over the pins and disposed between the discs, the outermost member of said discs having a non-circular opening formed therein and said handle grip having a corresponding non-circular projection extending down into said opening.

3. In a cooking unit of the character set forth, a grill, a manually manipulatable member having a pivotal connection with said grill, a handle attaching bracket fastened to said member at a point opposite from the pivotal connection, a handle fastened to said bracket, said handle comprising a handle grip having an opening extending therethrough, a holding screw bolt passing through said handle grip and threadedly engaging said bracket and an insulating mount between the handle grip and said bracket comprising a plurality of spaced pins carried by the bracket, a plurality of spacer discs threaded over said pins with spacing bushings threaded over the pins and disposed between the discs, the outermost member of said discs having a non-circular opening formed therein and said handle grip having a corresponding non-circular projection extending down into said opening, and a support pivotally fastened to one of said pins and engaging the grill for supporting the manipulatable member in spaced relation with the grill.

4. In a cooking unit of the character set forth a grill, a manually manipulatable member having a pivotal connection with said grill, a handle attaching bracket fastened to said member at a point opposite from the pivotal connection, a handle fastened to said bracket, said handle comprising a handle grip having an opening extending therethrough, a holding screw bolt passing through said handle grip and threadedly engaging said bracket and an insulating mount between the handle grip and said bracket comprising a plurality of spaced pins carried by the bracket, a plurality of spacer discs threaded over said pins with spacing bushings threaded over the pins and disposed between the discs, the outermost member of said discs having a non-circular opening formed therein and said handle grip having a corresponding non-circular projection extending down into said opening, and a support pivotally fastened to one of said pins and engaging the grill for supporting the manipulatable member in spaced relation with the grill, the support being provided with a plurality of angularly disposed supporting points for engaging the grill and supporting the manipulatable member at distances from the grill varying according to the angular position of the support about its pivot point.

5. In a cooking unit of the character set forth a grill, a reflector member hinged to the grill to permit the reflector member to either rest upon the grill or to be supported in a substantially vertical position with respect thereto, a handle carried by said reflector unit at a point peripherally displaced from the hinge and an adjustable supporting member carried by said handle at a point adjacent the grill and adapted to engage the grill to lift the reflector in cooperation with the hinge from contact with the grill, said supporting member being pivotally attached to the handle and provided with a multiplicity of angularly disposed supporting points at distances varying from the handle to support the reflector at varying distances according to the angular position of the support about its pivot.

6. In a cooker of the character set forth, a base element, an upper element, hinge means on one side of said elements and connecting the same for relatively vertical movement and a segmental support pivotally carried by one of said elements and on the opposite side of said element from said hinge means and provided with a multiplicity of supporting parts at varying distances from the pivotal axis of said segmental support which engage the other of said elements and spaces the elements varying distances from each other, said segmental support being mounted for pivotal movement about an axis disposed at right angles to the axis of the hinge means.

WILLIAM C. REHM.